Figure 1:
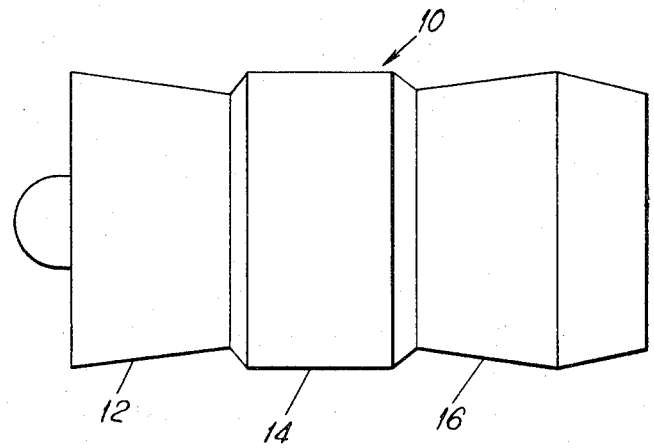

United States Patent
Kent et al.

[15] 3,635,586
[45] Jan. 18, 1972

[54] METHOD AND APPARATUS FOR TURBINE BLADE COOLING

[72] Inventors: Nelson H. Kent, Derby; Keith P. L. Fullagar, Spondon, both of England

[73] Assignee: Rolls Royce Limited, Derby, England

[22] Filed: Apr. 6, 1970

[21] Appl. No.: 25,740

[52] U.S. Cl. .............................. 416/97, 415/115, 416/95, 416/96, 416/90, 60/39.66
[51] Int. Cl. ........................................ F01d 5/18, F02c 7/12
[58] Field of Search ........................ 60/39.66; 415/115, 116; 416/95, 96, 97, 90, 92

[56] References Cited

UNITED STATES PATENTS

| | | |
|---|---|---|
| 2,988,325 | 6/1961 | Dawson .............................. 415/115 X |
| 3,542,486 | 11/1970 | Kercher et al. ..................... 415/115 X |
| 3,533,711 | 10/1970 | Kercher .............................. 416/97 X |
| 3,437,313 | 4/1969 | Moore .............................. 60/39.66 X |

Primary Examiner—Allan D. Herrmann
Attorney—Cushman, Darby & Cushman

[57] ABSTRACT

A method of cooling turbine blades of a fluid flow machine in which relatively low-temperature air is bled from a relatively high-pressure source and is split into at least two separate portions, one portion of which is fed to the leading edge of one or more of the blades of a turbine and the other portion of which is fed into one or more of the blades at a location rearwardly of the first portion.

10 Claims, 5 Drawing Figures

3,635,586

PATENTED JAN 18 1972

SHEET 1 OF 2

Inventors
NELSON H. KENT
KEITH P. L. FULLAGAR

By Cushman, Darby & Cushman
Attorneys

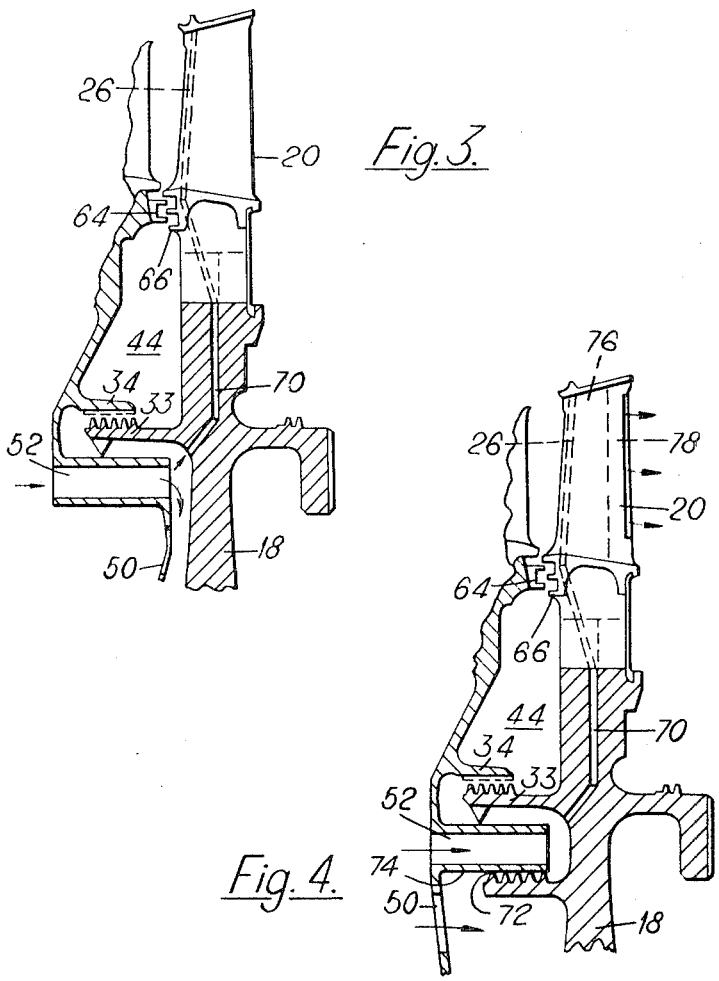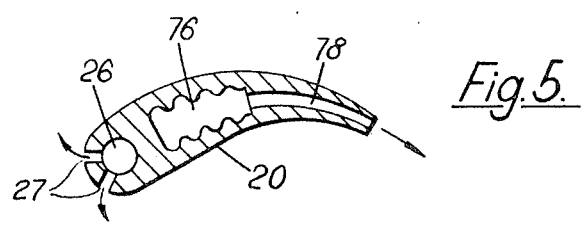

METHOD AND APPARATUS FOR TURBINE BLADE COOLING

This invention relates to fluid flow machines such as gas turbine engines and in particular to the cooling of the turbine blades of such machines.

The present invention provides a method of cooling turbine blades of a fluid flow machine in which relatively low-temperature air is bled from a relatively high-pressure source and is split into at least two separate portions, one portion of which is fed to the leading edge of one or more of the blades of a turbine and the other portion of which is fed into one or more of the blades at a location rearwardly of the first portion.

The relatively high-pressure source is preferably a compressor and one or both of the split portions of cooling air may be given a swirl component before entering the or each blade.

The said one portion of air may either pass along a duct formed internally of the blade adjacent the leading edge of the or each blade and pass out of the or each blade at the blade tip or tips, or the duct may be open along one side at the leading edge of the or each blade and the air may pass out of the or each blade at the leading edge or edges and flow over one or both of the convex and concave surfaces of the or each blade to provide a film cooling effect.

The said other portion of air may either pass out at the tip or the trailing edge of the or each blade.

The said one portion of air may be further divided so that a part flows over the forward face of the turbine disc for cooling purposes and also pressure balances a seal disposed between a stationary part of the fluid flow machine and the rotatable turbine.

The present invention further provides a fluid flow machine having a source of relatively high-pressure cool air and at least one turbine, means for dividing the cool air along at least two separated flow paths, the first path of which leads along or adjacent the leading edge of one or more blades of the turbine and the second path of which leads along the blade or blades at location rearwardly of the first path in the or each blade.

Means may be provided in the each or each path before the blade or blades to introduce a swirl component to the cool air.

Figure 2:
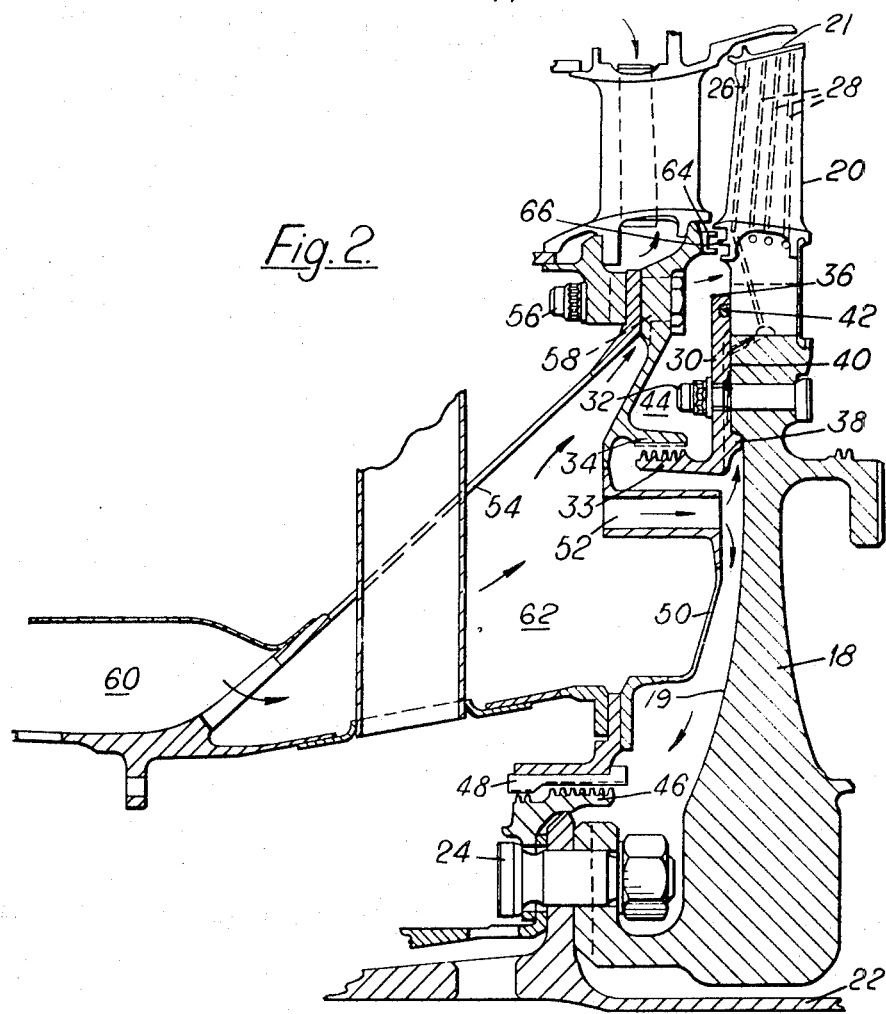

The present invention will now be more particularly described by way of explanation only with reference to the accompanying drawing in which:

FIG. 1 shows a diagrammatic representation of a fluid flow machine to which one form of the present invention has been applied and FIG. 2 shows a detail view of a portion of the machine shown in FIG. 1, FIG. 3 shows a modified form of the arrangement shown in FIG. 2, FIG. 4 shows a further modification of the invention and FIG. 5 shows a cross section of a turbine blade which can be used in conjunction with the present invention.

In the example shown in the figures, the fluid flow machine comprises a gas turbine engine 10 which includes compressor means 12, combustion apparatus 14 and turbine means 16. Referring more particularly to FIG. 2, there is shown a turbine disc 18 having a number of blades 20 slotted into the disc which is secured to a turbine shaft 22 by means of a number of bolts 24.

A duct 26 is formed in each blade 20 and passes from the root along the leading edge and passes out at the tip 21 of each blade. A number of further ducts 28 are also formed in each blade at a location rearwardly of the duct 26 and the ducts 28 also pass from the root to the tip 21 of the blade, although the ducts 26 and 28 are completely separate and there can be no intercommunication between them.

An annular ring 30 is attached to the disc 18 by bolts 32 and carries a sealing element 33 which engages with a stationary sealing portion 34 on the engine. The ring 30 is spaced away from the disc 18 by means of a flange 36 and projections 38 so that an annular passage 40 is formed between the ring and the turbine disc.

A sealing ring 42 is mounted in the flange 36 to prevent the escape of air into the space 44 forward of the turbine disc.

A rotatable sealing element 46 is attached to the turbine disc and shaft by the bolts 24 and cooperates with a stationary sealing element 48 mounted on the engine.

A structural web 50 of the engine has a number of equispaced passages 52 in each of which is located means for imparting a swirl component to air which passes through the passages. A suitable means for swirling the cooling air is shown in our the common assignees U.S. Pat. No. 2,988,325, issued June 13, 1961, to Lindsay Graham Doyle.

The web 50 is attached to another web 54 by bolts 56 and passages 58 are provided for the throughflow of air, the passages having means for imparting a swirl component to air which passes through them. The web 50 has sealing projections 64 which cooperate with similar projections 66 on the disc 18.

In FIGS. 3, 4 and 5 the same reference numerals have been used to indicate similar components as shown in FIGS. 1 and 2. In FIGS. 3 and 4 the annular ring has been dispensed with and a number of holes 70, one for each blade have been drilled in the disc 18 for the passage of cooling air to the leading edges of the blades.

In FIG. 4, the web 50 has been displaced rearwardly and a sealing element 72 engages with an annular ring 74 which forms part of a duct defining the passages 52. In this arrangement all of the cooling air flows to the leading edges of the blade and a separate flow of air to the forward face 19 of the disc for thrust balancing may be bled from a separate part of the compressor means 12. The operation of the arrangements shown in FIGS. 3 and 4 are analogous to the operation of the arrangement shown in FIG. 2.

In FIG. 5, the duct 26 has a number of short passages 27, so that the cooling air can pass out of the blade and flow over the surface to provide a film cooling effect and alleviate the problem of oxidation at the leading edge.

The ducts 28 shown in the previous figures are replaced by a duct 76 through which air flows outwardly and a duct 78 in communication with the duct 78 and open at the trailing edge of the blade for the exhaust of the cooling air. The blade can be either cast, extruded or forged in two pieces which are welded or brazed together.

In all of the arrangements described the swirling means may be omitted if required.

It has been found that because the flow of cooling air is divided a supply of cooling air can be supplied at a higher pressure than could have been achieved merely by supplying the air through the passages 58 and the air can be of sufficient pressure to overcome the relative total head at the stagnation point on the leading edge of the blade.

Referring to FIG. 2 in operation, high-pressure cooling air is bled from the compressor means 12 and passes along a duct 60 into a chamber 62 formed between the webs 50 and 54 of the engine. One portion of the cooling air flows along a first flow path through the passages 52 where the air is given a swirl component. The air is arranged to expand through the passages which causes a drop in temperature thereby assisting in the cooling effect, although a small decrease in pressure is also caused. The cooling air then flows across the forward face of the disc, into the annular space 40 along the ducts 26 and out of the blades at the tips 21.

A further portion of cooling air flows along a second flow path through the passages 58 where it is given a swirl component and along the ducts 28 in the blades. The two flow paths are kept completely separate by means of the seal 33, 34 and there is no intercommunication between the duct 26 and the ducts 28 in each blade.

A portion of the cooling air flows over the forward face of the turbine disc 18 and pressure balances the seal 46, 48 and also assists in the thrust balancing of the disc.

In an alternative arrangement (not shown) the duct 26 may be in the form of a channel open along the leading edge of the blade so that the cooling air which is of sufficiently high pressure to overcome the relative total head at the stagnation point on the leading edge to flow over either or both of the convex and concave surfaces to provide a film cooling effect.

Also one or more of the ducts 28 may be arranged to exhaust at or adjacent the trailing edge of the blade as opposed to the tip as shown in FIG. 4.

We claim:

1. A method of cooling the turbine blades of a fluid flow machine, each of said blades having a leading edge and a rearward portion, said method comprising the steps of:

bleeding air at a relatively low temperature from a relatively high-pressure source, splitting the air into at least two separate portions, at a point remote from said blades, feeding one of said portions into the interior of the leading edge of one or more of the blades of a turbine, and feeding the other portion into the interior of one or more of the blades at the rearward portion thereof.

2. The method as claimed in claim 1 wherein the relatively high-pressure source is a compressor and including the step of imparting a swirling component to at least one of the portions of cooling air before said portion enters the respective blade.

3. The method as claimed in claim 2 including the step of passing said one portion of air along a duct formed internally of each blade adjacent the leading edge of each blade and out of each blade at the blade tips.

4. The method as claimed in claim 2 including the step of passing said one portion of air along a duct which is open along one side at the leading edge of each blade and passing the air out of each blade at the leading edges thereof whereby said one portion of the cooling air will flow over at least one of the surfaces of each blade to provide a film cooling effect.

5. The method as claimed in claim 3 including the step of passing said other portion of air out at the tip of each blade.

6. The method as claimed in claim 4 including the step of passing said other portion of air out of the trailing edge of each blade.

7. The method as claimed in claim 5 including the step of further dividing said one portion of air so that a part thereof flows over the forward face of the turbine disc for the purpose of cooling the disc and for pressure balancing a seal disposed between a stationary part of the fluid flow machine and the rotatable turbine.

8. A fluid flow machine comprising compressor means, combustion equipment and turbine means in flow series, said turbine means including a turbine disc having a plurality of turbine blades; and means for cooling at least one of said turbine blades, said cooling means comprising a source of relatively high-pressure cool air, duct means for feeding said air to said turbine means, means at a point remote from said blade for dividing the cool air along at least two separated flow paths, said one blade having a first passageway in its leading edge in communication with one of said flow paths and a second passageway located rearwardly of said first passageway in communication with the other of said flow paths whereby said one of said flow paths can feed cool air to said first passageway at a pressure greater than that at which the other flow path feeds said air to said second passageway.

9. The fluid flow machine as claimed in claim 8 wherein said second passageway includes a plurality of separate ducts.

10. The fluid flow machine as claimed in claim 8 wherein said first passageway includes a plurality of openings extending along said leading edge of said at least one blade for discharging the air from said first passageway.

* * * * *